Figure 1:
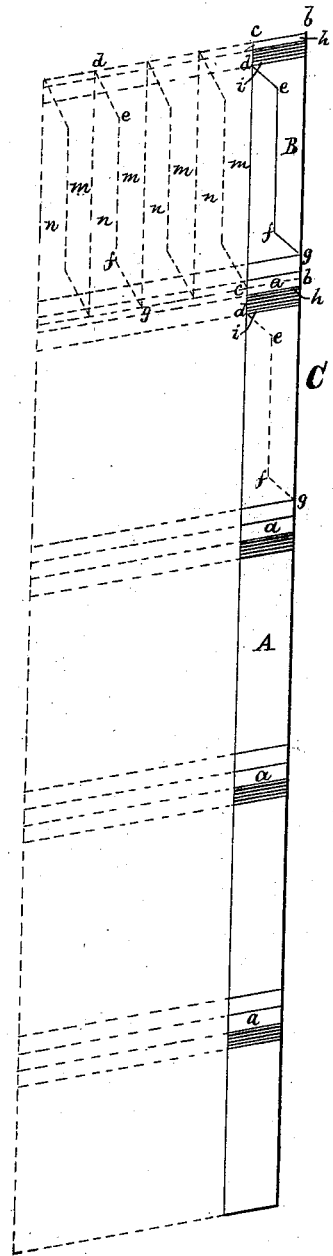

G. E. WHITNEY.
Manufacture of Horseshoe-Nails.

No. 199,767. Patented Jan. 29, 1878

WITNESSES:
N. C. Lombard
E. A. Hemmenway

INVENTOR:
George E. Whitney

UNITED STATES PATENT OFFICE.

GEORGE E. WHITNEY, OF WINCHESTER, ASSIGNOR TO LUCIUS O. ROBERTSON, TRUSTEE, OF BOSTON, MASSACHUSETTS.

IMPROVEMENT IN THE MANUFACTURE OF HORSESHOE-NAILS.

Specification forming part of Letters Patent No. 199,767, dated January 29, 1878; application filed November 6, 1877.

*To all whom it may concern:*

Be it known that I, GEORGE E. WHITNEY, of Winchester, in the county of Middlesex and State of Massachusetts, have invented certain new and useful Improvements in the Manufacture of Horseshoe-Nails, of which the following, taken in connection with the accompanying drawings, is a specification.

My invention relates to the manufacture of that class of horseshoe-nails that are made by punching or cutting a blank from a hot-rolled plate or bar, and then elongating, shaping, and finishing said blank into a nail in a cold state, and has for its object a greater degree of economy in the use of stock than has heretofore been accomplished in punching or cutting blanks from a plate or bar; and it consists, first, in rolling the plate or bar from which the blank is to be cut to a width equal to one or more times the width of the head of the desired blank to be cut therefrom, and at the same time forming thereon raised ribs extending transversely across said bar or plate in a direction oblique to the parallel edges of said bar or plate, said ribs being formed thereon at regular and equal distances apart, about equal to the length of the desired blank to be cut therefrom, the novel feature of said plate or bar being the obliquity of said ribs, whereby the bar or plate is adapted to have cut therefrom a blank of peculiar form, as will be described.

My invention further consists in cutting nail-blanks from a bar of hot-rolled iron of a width about equal to the width or thickness of the desired nail-head, and a thickness about equal to the desired thickness or width of the nail-shank just under the head, and provided at regular and equal intervals with enlargements equal in thickness to the thickness or width of the desired nail-head, by dividing said bar, in the center of its width, for a distance about equal to the length of the shank of the desired blank, and parallel, or nearly so, to the edges of said bar, and by an oblique cut from one end of said central slit to one edge of the bar, and by a similar oblique cut from the opposite end of said central slit to the opposite edge of the bar, and at the same time cutting across the bar to divide two heads, whereby a single die, adapted to cut through the bar to shape the two ends and one side of a single blank, may be made to produce from said bar two blanks of uniform shape and size at each operation of said die.

My invention further consists in the method of manufacturing horseshoe-nails by cutting or punching from a bar or plate of hot-rolled iron, having formed thereon at regular and equal intervals raised ribs or enlargements, nail-blanks having two straight sides contiguous to each other, and provided upon its two other sides with projections or an increased width and thickness of stock, from which to form the nail-head, bending the shank of said blank at its junction with the head, and compressing, upsetting, or otherwise shaping said head, and then, by a distinct and separate operation, elongating and condensing the shank by rolling it, and trimming and shaping the point of the nail by means of dies, all of which operations are performed upon the metal while in a cold state, as will be described.

A great advantage in saving of stock is obtained by this invention, as will be readily seen when it is understood that in every case, in cutting or punching a blank having a symmetrical head—that is, with an equal projection upon two of its sides opposite each other—stock equivalent to one nail is wasted to every section of the bar or plate of a length equal to the length of a blank, which amounts to quite a large percentage of the whole when the bar or plate is narrow, while in this case the bar or plate is rolled to a gage of the exact width desired—say one or more times the width of the head of the desired blank; and in punching or cutting the blanks therefrom the entire width of the bar or plate is utilized and no waste is made.

Figure 2:
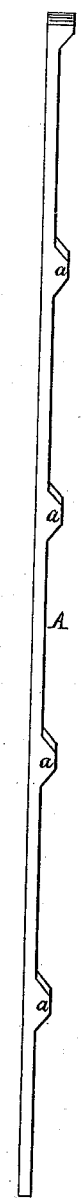
Figure 3:
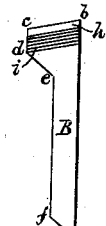
Figure 4:
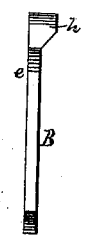
Figure 5:
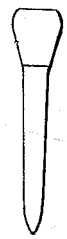
Figure 6:

Figure 1 of the drawings is an elevation of the bar from which the blanks are to be cut, and Fig. 2 is an edge view of the same. Figs. 3 and 4 are, respectively, a side elevation and an edge view of the blank as cut from the bar; and Figs. 5 and 6 are, respectively, a side elevation and an edge view of the blank after the head has been shaped.

A is a bar of hot-rolled iron, of a width about equal to the width of the head of the desired blank, or twice the width of the body or shank of the same, and a thickness, in general, about equal to the thickness of the shank of said blank, and having formed thereon, at regular and equal intervals, raised ribs a a, extending across said bar obliquely to the edges thereof, and each extending along said bar in the direction of its length sufficiently far to furnish the necessary stock to form the heads of two nails when divided through the center transversely of the bar, as will be described.

B is the blank as cut from the bar A by cutting through the lines b c and d e f g, as shown in full lines at the upper end of the bar A in Fig. 1, and also in dotted lines in the next section below in the same figure, said blank being provided upon one side with the projection h, which consists of one-half of one of the ribs a, and also upon one edge with the projection i, produced by the oblique cuts d e or f g, and also having an oblique or beveled point, also formed by one of the oblique cuts d e or f g, whereby the cutting of one blank by severing the bar A on the lines b c and d e f g, as shown in dotted lines at C, Fig. 1, (the first blank B having been previously cut,) produces two complete blanks of uniform shape and size, without waste.

If desired, plates of a width any number of times greater than the width of the bar A may be used, and blanks of substantially the same form be cut therefrom without waste, by changing the oblique lines of division d e and f g, so that the ends d and g shall intersect with the line b c, and cutting around the whole outline of the blank, punching out each alternate blank, as shown in dotted lines in Fig. 1, and designated by the letter m, the blanks n being completely shaped, except severing the heads from the plate, by the operation of punching out the blanks m, the blanks n being severed from the plate by the act of punching out the alternate blanks in the next section of the plate, so that, after cutting the alternate blanks from the first section across the end of the plate, each operation of the punching-die will produce two blanks.

To shape and complete the head of the nail the blank B is subjected to the action of dies, to bend the shank at e in the direction of its width till the shank of the blank assumes a position at right angles to the line b c, and to upset and shape the head, as shown in Figs. 5 and 6.

By an after-operation the shank of the nail is subjected to the action of rolls, to elongate and reduce the thickness of said shank, and condense the metal thereof, after which the point of the nail is trimmed and beveled by means of dies, in a well-known manner.

If desired, the bar A may be rolled to a width equal to the thickness of the head of the desired blank, or twice the thickness of the shank of said blank, and a thickness about equal to the width of the shank of the desired blank, with the ribs a a rolled thereon; and blanks may be cut therefrom the same as heretofore described, without waste, the only difference being that in the case illustrated in the drawings, and first described, the cut made by the die in cutting out the blank forms one of the edges of the blank, while in that last described the cut made by the die forms one of the broader sides.

I am aware that nail-blanks have been punched or cut from a hot-rolled ribbed plate, and then formed into horseshoe-nails by rolling the shanks in a cold state; and, therefore, I do not claim, broadly, the cutting of headed nail-blanks from a hot-rolled ribbed plate; but

What I claim as new, and desire to secure by Letters Patent of the United States, is—

1. A hot-rolled bar or plate of iron having formed thereon, at regular and equal distances, raised ribs a a, extending transversely across said bar or plate in a direction oblique to the parallel edges thereof, substantially as and for the purposes described.

2. The method of producing nail-blanks having two straight sides contiguous to each other, from which to manufacture horseshoe-nails, which consists in first producing, by hot rolling, a bar of iron, the body or main portion of which is of a width and thickness about equal to the width of the head and the thickness of the shank, respectively, or to the thickness of the head and the width of the shank, respectively, of the desired blank, and provided at regular and equal intervals, upon one of its sides or edges, with raised ribs or an increased thickness of stock, arranged obliquely to the edges of said bar, and then, by means of suitable dies, cutting said bar transversely across to sever a blank and form the head end of two blanks, and at the same time divide a section of said bar by cutting through the line e f parallel, or nearly so, to the two sides or edges of said bar and the two short oblique lines d e and f g, extending from the opposite ends of the parallel cut e f to the opposite sides of the bar, substantially as described.

3. The method of manufacturing horseshoe-nails herein set forth, which consists in cutting or punching from a bar or plate of hot-rolled ribbed iron blanks having two contiguous straight sides, and provided upon their opposite sides with projections or an increased thickness and width of stock, to form a head oblique to its shank, bending said shank at its junction with the head, and compressing, upsetting, and shaping said head by means of suitable dies, and then, by another operation, rolling the shank of the blank to elongate, condense, and shape it, and then trimming and beveling the point of the nail, substantially as herein set forth and described.

Executed at Boston, Massachusetts, this 1st day of November, A. D. 1877.

GEORGE E. WHITNEY.

Witnesses:
N. C. LOMBARD,
E. A. HEMMENWAY.